US011900304B2

(12) United States Patent
Ueda

(10) Patent No.: US 11,900,304 B2
(45) Date of Patent: Feb. 13, 2024

(54) WAREHOUSING AND SHIPPING MANAGEMENT SYSTEM, WAREHOUSING AND SHIPPING MANAGEMENT METHOD, AND NON-TRANSITORY COMPUTER-READABLE MEDIUM

(71) Applicant: SATO HOLDINGS KABUSHIKI KAISHA, Tokyo (JP)

(72) Inventor: Yoshiyuki Ueda, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 15/765,319

(22) PCT Filed: Oct. 3, 2016

(86) PCT No.: PCT/JP2016/079287
§ 371 (c)(1),
(2) Date: Apr. 2, 2018

(87) PCT Pub. No.: WO2017/068949
PCT Pub. Date: Apr. 27, 2017

(65) Prior Publication Data
US 2018/0293534 A1 Oct. 11, 2018

(30) Foreign Application Priority Data

Oct. 23, 2015 (JP) ................................. 2015-208601

(51) Int. Cl.
*G06Q 10/083* (2023.01)
*B65G 1/137* (2006.01)
*G06K 7/14* (2006.01)
*G06K 19/07* (2006.01)

(52) U.S. Cl.
CPC ......... *G06Q 10/083* (2013.01); *B65G 1/1371* (2013.01); *G06K 7/1447* (2013.01); *G06K 19/0723* (2013.01)

(58) Field of Classification Search
CPC .. G06Q 10/083; B65G 1/1371; G06K 7/1447; G06K 19/0723
(Continued)

(56) References Cited

U.S. PATENT DOCUMENTS 8,224,664 B1 * 7/2012 Louie ..................... G16H 20/13
705/2
9,305,283 B1 * 4/2016 Lauka ................ G06K 7/10237
(Continued)

FOREIGN PATENT DOCUMENTS

| JP | 2007-254040 | A | 10/2007 | |
| JP | 2007254040 | * | 10/2007 | ............. B65G 1/137 |
| JP | 2007254040 | A * | 10/2007 | |

OTHER PUBLICATIONS

Design of an RFID System for Asset Tracking and Inventory Management at Illinois State University, Sarathchandra, ProQuest Dissertations and Theses (2014) (Year: 2014).*

*Primary Examiner* — Jeff Zimmerman
*Assistant Examiner* — Mark C Clare
(74) *Attorney, Agent, or Firm* — Foley & Lardner LLP

(57) ABSTRACT

A warehousing and shipping management system stores first coded information contained in optical recognition codes attached to each of a plurality of objects and second coded information contained in object-attached radio communication tags attached to each of the plurality of objects, acquire the first coded information contained in the optical recognition code attached to a target object, automatically acquires location information of each of the object-attached radio communication tags and location information of an operator's radio communication tag; and associates the stored first coded information corresponding to the optical recognition code attached to the target object and the stored second coded information corresponding to the object-attached radio communication tag attached to the target object (Continued)

on the basis of location information of each of the object-attached radio communication tags and location information of the operator's radio communication tag when the first coded information is acquired.

13 Claims, 7 Drawing Sheets

(58) Field of Classification Search
USPC .......................................................... 705/330
See application file for complete search history.

(56) References Cited

U.S. PATENT DOCUMENTS

| | | | |
|---|---|---|---|
| 2002/0070862 A1* | 6/2002 | Francis | G06Q 10/087 340/988 |
| 2006/0054682 A1* | 3/2006 | de la Huerga | G16H 20/10 235/375 |
| 2007/0282482 A1* | 12/2007 | Beucher | G06Q 10/08 700/226 |
| 2008/0143532 A1* | 6/2008 | Murrah | G06K 19/0717 340/572.4 |
| 2011/0153614 A1* | 6/2011 | Solomon | B65G 1/127 707/769 |
| 2014/0209676 A1* | 7/2014 | Reynolds | G06K 19/0723 235/385 |
| 2014/0240088 A1* | 8/2014 | Robinette | G08B 21/0219 340/5.61 |
| 2015/0199602 A1* | 7/2015 | van der Weide | G06K 7/10366 235/492 |
| 2016/0176635 A1* | 6/2016 | Varley | B65G 1/137 700/216 |

* cited by examiner

WAREHOUSING AND SHIPPING MANAGEMENT SYSTEM, WAREHOUSING AND SHIPPING MANAGEMENT METHOD, AND NON-TRANSITORY COMPUTER-READABLE MEDIUM

TECHNICAL FIELD

The present invention relates to a warehousing and shipping management system, a warehousing and shipping management method, and a program.

BACKGROUND ART

JP2007-254040A discusses a management system in which an IC tag is attached to an article stored in a rack in advance, and identification information of the IC tag and an article number are stored in a database by associating them with each other.

SUMMARY OF INVENTION

In this system, in order to store the identification information of the IC tag and the article number in the database by associating them with each other, for example, it is necessary to perform an operation of reading the IC tag attached to the article using a reader and then scanning a bar code attached to the article using a scanner, or an operation of manually inputting information indicating a relationship between the identification information of the IC tag and the article number in the database, or the like.

However, when such an operation is performed for overall stored articles, this is cumbersome and increases an operator's work burden, which is disadvantageous.

In view of the aforementioned problems, it is therefore an object of the present invention to provide a warehousing and shipping management system capable of reducing an operator's work burden.

According to an aspect of the present invention, there is provided a warehousing and shipping management system including: memory means configured to store first coded information contained in optical recognition codes attached to each of a plurality of objects and second coded information contained in object-attached radio communication tags attached to each of the plurality of objects; coded information acquiring means configured to acquire the first coded information contained in the optical recognition code attached to a target object out of the plurality of objects; location information acquiring means, such as at least one radio communication unit, configured to automatically acquire location information of each of the object-attached radio communication tags and location information of an operator's radio communication tag attached to an operator; and processing means configured to associate the first coded information corresponding to the optical recognition code attached to the target object among the first coded information that is stored in the memory means and the second coded information corresponding to the object-attached radio communication tag attached to the target object among the second coded information that is stored in the memory means on the basis of the location information of each of the object-attached radio communication tags and the location information of the operator's radio communication tag when the first coded information was acquired by the coded information acquiring means.

According to another aspect of the present invention, there is provided a warehousing and shipping management method including: storing first coded information contained in optical recognition codes attached to each of a plurality of objects and second coded information contained in object-attached radio communication tags attached to each of the plurality of objects; acquiring the first coded information contained in the optical recognition code attached to a target object out of the plurality of objects; automatically acquiring location information of each of the object-attached radio communication tags and location information of an operator's radio communication tag attached to an operator; and associating the first coded information corresponding to the optical recognition code attached to the target object among the stored first coded information and the second coded information corresponding to the object-attached radio communication tag attached to the target object among the stored second coded information on the basis of location information of each of the object-attached radio communication tags and the location information of the operator's radio communication tag when the first coded information was acquired.

According to still another aspect of the present invention, there is provided a program executable by a computer of a warehousing and shipping management system, the program causing the computer to execute: storing first coded information contained in optical recognition codes attached to each of a plurality of objects and second coded information contained in object-attached radio communication tags attached to each of the plurality of objects; acquiring the first coded information contained in the optical recognition code attached to a target object out of the plurality of objects; automatically acquiring location information of each of the object-attached radio communication tags and location information of an operator's radio communication tag attached to an operator; and associating the first coded information corresponding to the optical recognition code attached to the target object among the stored first coded information and the second coded information corresponding to the object-attached radio communication tag attached to the target object among the stored second coded information on the basis of the location information of each of the object-attached radio communication tags and the location information of the operator's radio communication tag when the first coded information was acquired.

According to the aspects of the present invention, it is possible to associate the first coded information and the second coded information stored in the memory means on the basis of the location information of each of the object-attached radio communication tags and location information of the operator's radio communication tag just by acquiring the first coded information contained in the optical recognition code attached to the target object. As a result, it is possible to associate the first coded information and the second coded information without a cumbersome work. Therefore, it is possible to reduce an operator's work burden.

DESCRIPTION OF EMBODIMENTS

A warehousing and shipping management system (hereinafter, referred to as a management system) 100 according to an embodiment of the invention will now be described with reference to the accompanying drawings.

The management system 100 is a system for managing operations such as warehousing and shipping in a logistic warehouse on the basis of location information of an operator's radio communication tag (hereinafter, referred to as an "operator's tag") 10 attached to an operator and location information of an object-attached radio communication tag (hereinafter, referred to as an "object-attached tag") 20 attached to an object 1, that is, on the basis of location information of the operator and location information of the object 1.

Note that "an operator's tag 10 is attached to an operator" means that an operator holds the operator's tag 10 or that an operator's tag 10 is attached to a forklift or a bogie or the like used by the operator to carry the object 1.

Figure 1:
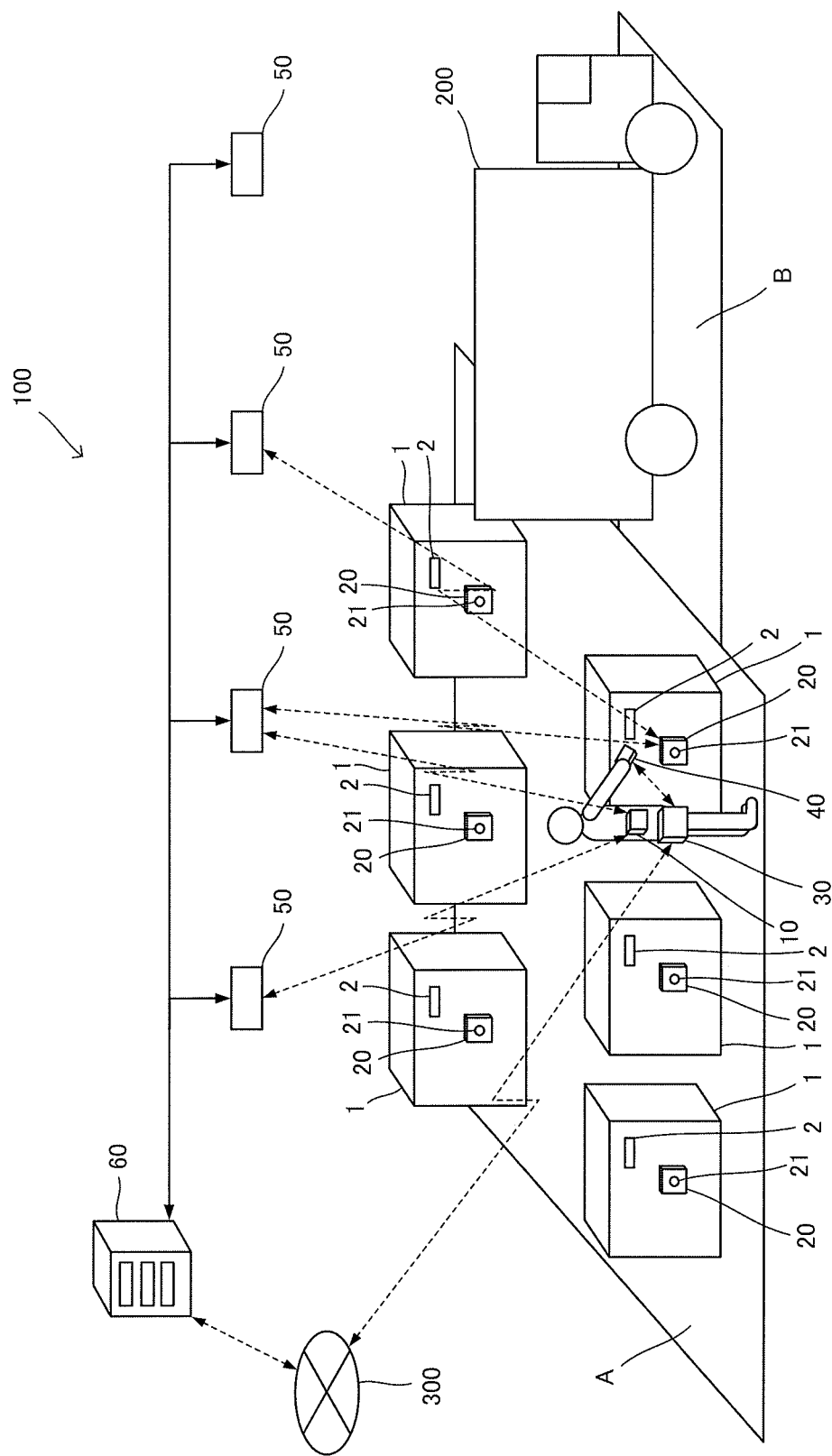
FIG. 1 is a diagram schematically illustrating a warehousing and shipping management system according to an embodiment of the invention.

FIG. 1 is a diagram schematically illustrating the management system 100. In FIG. 1, the operator performs inspection operation for an object 1 placed in an import area A prior to warehousing.

As illustrated in FIG. 1, the management system 100 includes an operator's tag 10 attached to an operator, a portable terminal 30 attached to an operator similarly to the operator's tag 10, an object-attached tag 20 attached to each object 1, a scanner 40 communicatably connected to the portable terminal 30 and used in an inspection operation for the object 1, a plurality of fixed communication units 50 installed in the vicinity of a ceiling of the warehouse, and a computer 60 communicatably connected to the portable terminals 30 and each fixed communication unit 50. In addition, the object-attached tag 20 has an LED 21.

When the object 1 is unloaded from an import truck 200 parked at an unloading dock B and is placed in the import area A, the object-attached tag 20 is attached to the object 1 prior to the inspection operation.

The computer 60 and the portable terminal 30 are connected to each other via a network 300 such as the Internet in a wireless manner. In addition, the computer 60 and each fixed communication unit 50 are connected to each other in a wired manner. In addition, the scanner 40 and the portable terminal 30 are connected to each other in a wireless manner. Alternatively, the computer 60 and each fixed communication unit 50 may connected to each other in a wireless manner, and the scanner 40 and the portable terminal 30 may be connected to each other in a wired manner.

The object 1 is attached with a bar code 2 as an optical recognition code. First coded information of the bar code 2 (hereinafter, referred to as "first information") contains information on the object 1 attached with this bar code 2.

The information on the object 1 is information by which a content of the object 1 can be specified, such as a product name, a part number, and a color. Note that this information may not be directly contained in the first information, but information for specifying the information may be contained in the first information. The object 1 may include various types of articles such as a building material, furniture, a tire, a cardboard box or a container containing an article, and an empty container containing no article.

Figure 2:
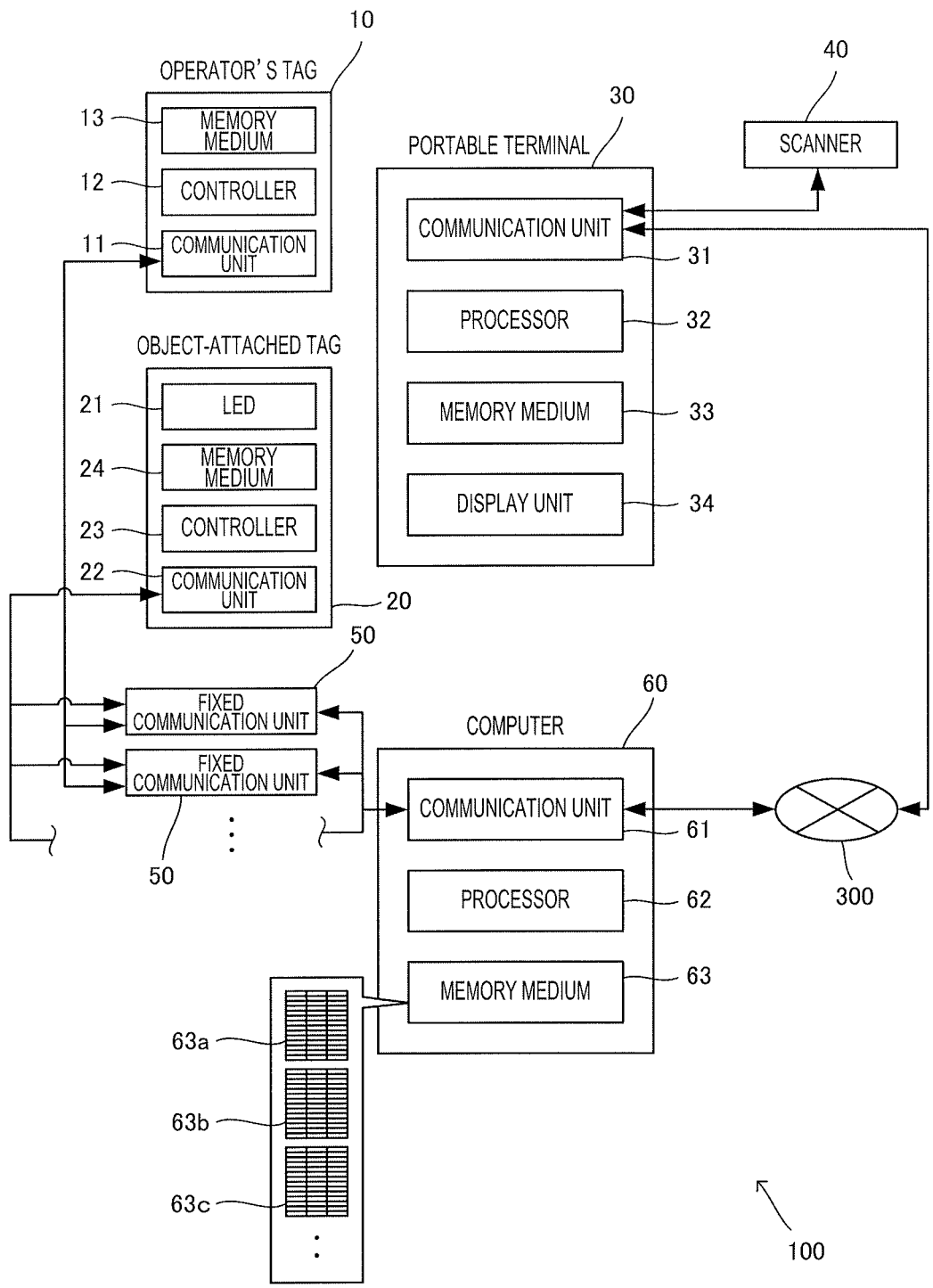
FIG. 2 is a schematic block diagram illustrating the warehousing and shipping management system according to an embodiment of the invention.

FIG. 2 is a schematic block diagram illustrating the management system 100.

As illustrated in FIG. 2, the object-attached tag 20 includes an LED 21, a communication unit 22 for performing radio communication, a controller 23 that controls the operations of the LED 21 and the communication unit 22, and a memory medium 24 in which second coded information (hereinafter, referred to as "second information") is stored. The second information includes an identification number of the object-attached tag 20.

The operator's tag 10 includes a communication unit 11 for performing radio communication, a controller 12 that controls operations of the communication unit 11, and a memory medium 13 in which third coded information (hereinafter, referred to as "third information") is stored. The third information includes an identification number of the operator's tag 10.

The portable terminal 30 includes a communication unit 31 for performing radio communication, a processor 32 that performs various computation processes, a memory medium 33 that stores various programs or the like, and a display unit 34 that displays various types of information output from the processor 32.

The portable terminal 30 may include, for example, a smart phone, a tablet terminal, a head-mount display terminal, or the like.

The computer 60 includes a communication unit 61 for performing communication, a processor 62 that performs various computation processes, and a memory medium 63 that stores a database for various programs, a database 63a for warehousing data of the object 1, a database 63b for second information of the object-attached tag 20 and third information of the operator's tag 10, a database 63c for information indicating a state of the object 1 stored in the warehouse, a database for various work instruction data such as warehousing instruction data or shipping operation instruction data, and the like.

The warehousing data stored in the database 63a contains first information contained in the bar code 2 attached to the object 1. In addition, various programs or the like stored in the memory medium 63 can be used by the portable terminal 30.

The operator's tag 10 is a tag that can be used in communication based on an ultra wide band (UWB) scheme, and communicates with each fixed communication unit 50 capable of communication based on the similar UWB scheme at all times.

The computer 60 positions a location of the operator's tag 10 on the basis of time for allowing the operator's tag 10 to receive pulse signals transmitted from each of two fixed communication units 50 and return them to each fixed communication unit 50. In this manner, the management system 100 can automatically acquire location information of the operator's tag 10 on the basis of a two-point positioning scheme.

Note that the computer 60 also acquires third information contained in the operator's tag 10 when the location is positioned, and collates the third information with information stored in the database 63b. As a result, the computer 60 recognizes that the tag whose location is positioned is the operator's tag 10.

Similar to the operator's tag 10, the object-attached tag 20 is a tag that can be used in communication based on an ultra wide band (UWB) scheme. Therefore, the management system 100 can also automatically acquire location information of the object-attached tag 20 on the basis of the two-point positioning scheme.

Subsequently, the inspection operation using the management system 100 at the time of importing will be described with reference to FIG. 3.

Figure 3:
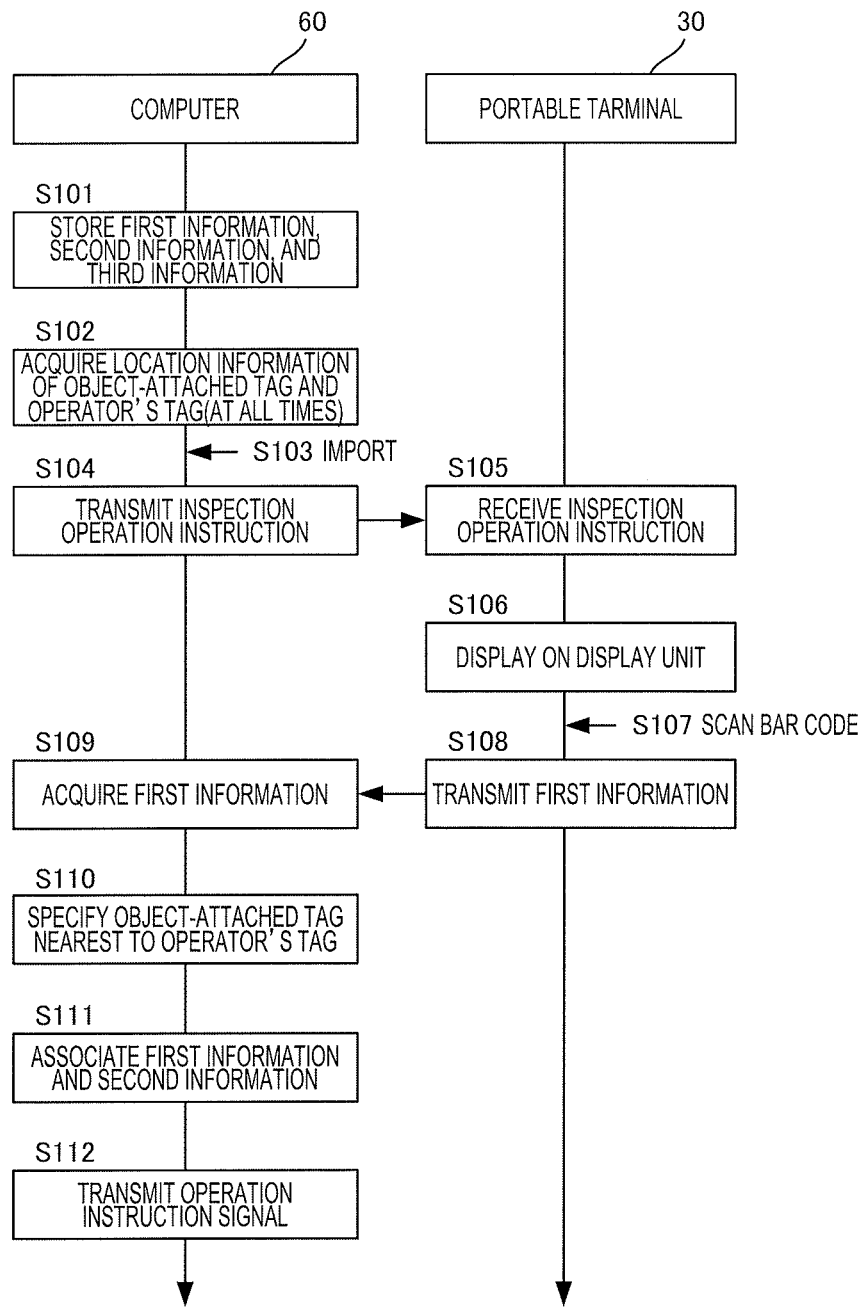
FIG. 3 is a flowchart illustrating an operation sequence of the warehousing and shipping management system at the time of an inspection operation.

FIG. 3 is a flowchart illustrating an operation sequence of the management system 100 at the time of the inspection operation.

As described above, when the object 1 is unloaded from the import truck 200, the object-attached tag 20 is attached to the object 1 prior to the inspection operation. According to this embodiment, any object-attached tag 20 may be attached to any object 1. Therefore, in the course of attaching of the object-attached tag 20 to the object 1, it is difficult to check which object-attached tag 20 is attached to which object 1 using the database of the computer 60.

However, if it cannot be confirmed which object-attached tag 20 is attached to which object 1 using the database, it is difficult to manage various processes using the location information of each object 1.

In this regard, the management system 100 according to this embodiment performs inspection of each imported object 1 by performing the inspection operation on the basis of the flowchart of FIG. 3, and associates the first information corresponding to the bar code 2 attached to each object 1 with the second information corresponding to the object-attached tag 20 attached to each object 1 on the database.

Note that the computer 60 externally acquires warehousing data including the first information before each object 1 is imported to the warehouse, and stores the warehousing data in the database 63*a*. In addition, the second information contained in the object-attached tag 20 operated in the warehouse and the third information contained in the operator's tag 10 are stored in the database 63*b* in advance (step S101).

The computer 60 acquires location information of the operator's tag 10 and location information of each object-attached tag 20 at all times (step S102).

As the object 1 is imported into the warehouse (step S103), the computer 60 transmits an inspection operation instruction generated on the basis of the warehousing data to the portable terminal 30 (step S104). The content of the inspection operation instruction includes information indicating the inspection operation, information regarding each imported object 1, and the like.

As the inspection operation instruction is received (step S105), the portable terminal 30 displays work information on the display unit 34 (step S106). As a result, an operator can recognize the work content. When the portable terminal 30 has a loudspeaker, a headphone, or the like, the work content may be notified to the operator by sound.

As the operator scans the bar code 2 attached to the target object 1 using the scanner 40 (step S107), the portable terminal 30 transmits the first information received from the scanner 40 to the computer 60 (step S108).

Alternatively, the scanner 40 and the computer 60 may be connected to each other via the network 300, and the first information may be directly transmitted from the scanner 40 to the computer 60.

As the first information is acquired (received) from the portable terminal 30 (step S109), the computer 60 specifies an object-attached tag 20 nearest to the operator's tag 10 on the basis of the location information of the operator's tag 10 and the location information of each object-attached tag 20 (step S110).

The computer 60 associates second information corresponding to the object-attached tag 20 specified in step S110 out of the second information stored in the database 63*b*, as the second information corresponding to the object-attached tag 20 attached to the target object 1, with first information matching with the acquired first information out of the first information stored in the database 63*a*, that is, first information corresponding to the bar code 2 attached to the target object 1 (step S111).

Since a location of the operator's tag 10 acquired when the operator scans the bar code 2 attached to the object 1 using the scanner 40 is very close to a location of the object-attached tag 20 attached to this object 1, it is possible to associate the first information corresponding to the bar code 2 attached to the target object 1 with the second information corresponding to the object-attached tag 20 attached to this object 1 on the database through the aforementioned process.

As a result, when the operator simply scans the bar code 2 attached to the target object 1 using the scanner 40, it is possible to associate the first information with the second information without a cumbersome operation such as an operation of reading the object-attached tag 20 attached to the object 1 using a reader and scanning the bar code 2 attached to the object 1 using the scanner 40, or an operation of manually entering information indicating a relationship between the second information of the object-attached tag 20 and the information regarding the object 1 into the database. Therefore, it is possible to reduce an operator's work burden.

Note that, when the warehousing data stored in the database 63*a* does not contain the first information matching with that acquired in step S109, the computer 60 determines abnormality in inspection and transmits an error signal to the portable terminal 30.

The computer 60 transmits an operation instruction signal for operating the LED 21 of the object-attached tag 20 corresponding to the second information associated with the first information in step S111 in a specific pattern indicating that the first information is associated, to the object-attached tag 20 via the fixed communication unit 50 (step S112).

As the operation instruction signal is received, the LED 21 of the object-attached tag 20 corresponding to the second information associated with the first information in step S111 is turned on or flickered in a specific pattern indicating that the first information is associated.

As a result, the operator can visually recognize which object-attached tag 20 is associated with the target object 1 in practice. In addition, the operator can also recognize that inspection is normally performed.

As the sequence subsequent to step S107 is executed for all imported objects 1, the inspection operation is terminated.

Subsequently, the warehousing operation using the management system 100 will be described with reference to FIGS. 4 and 5.

Figure 4:
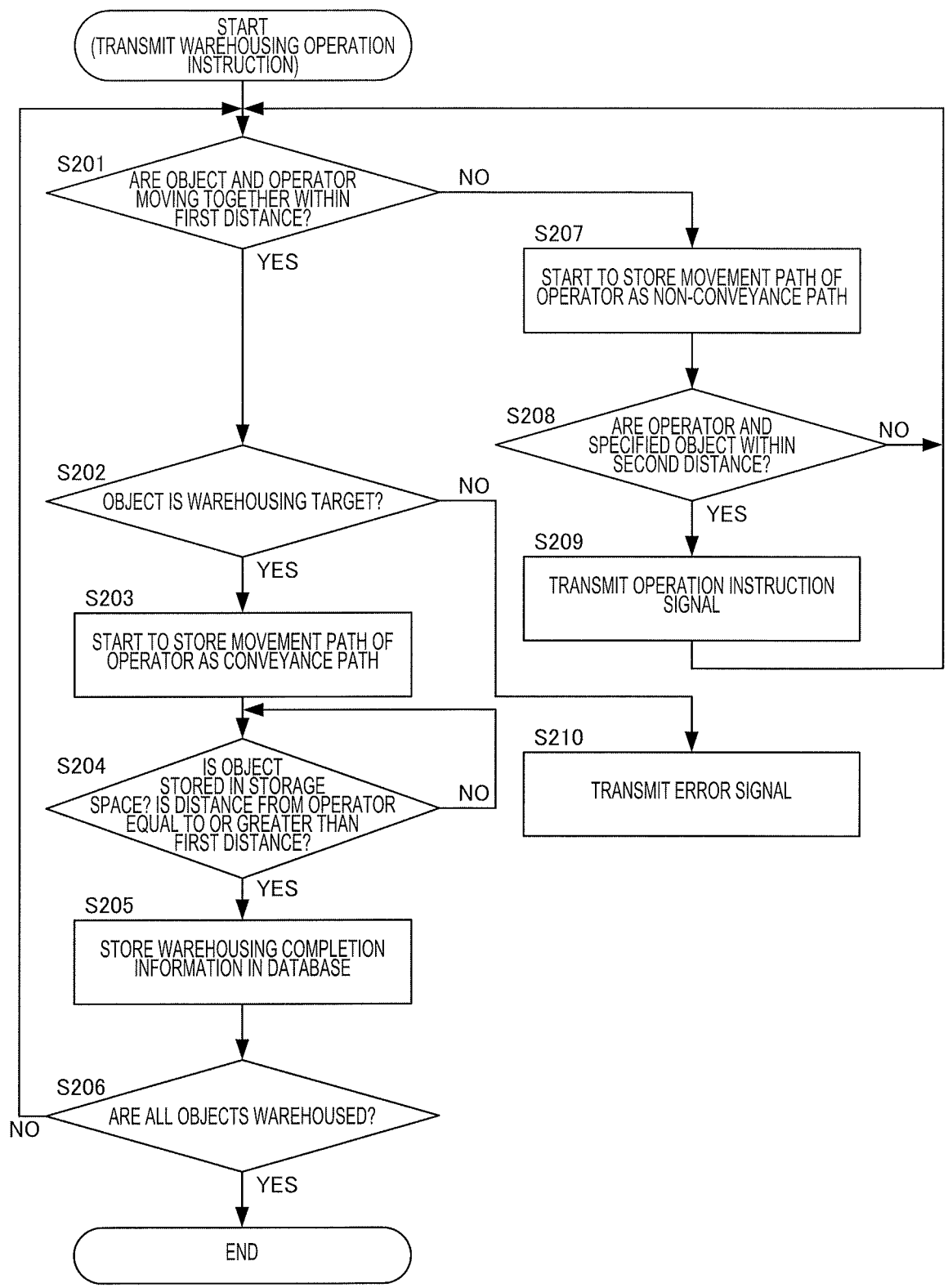
FIG. 4 is a flowchart illustrating a sequence of a warehousing process performed by a computer.

FIG. 4 is a flowchart illustrating a sequence of the warehousing process performed by the computer 60. FIG. 5 is a diagram illustrating a displayed content of the display unit 34.

Figure 5:
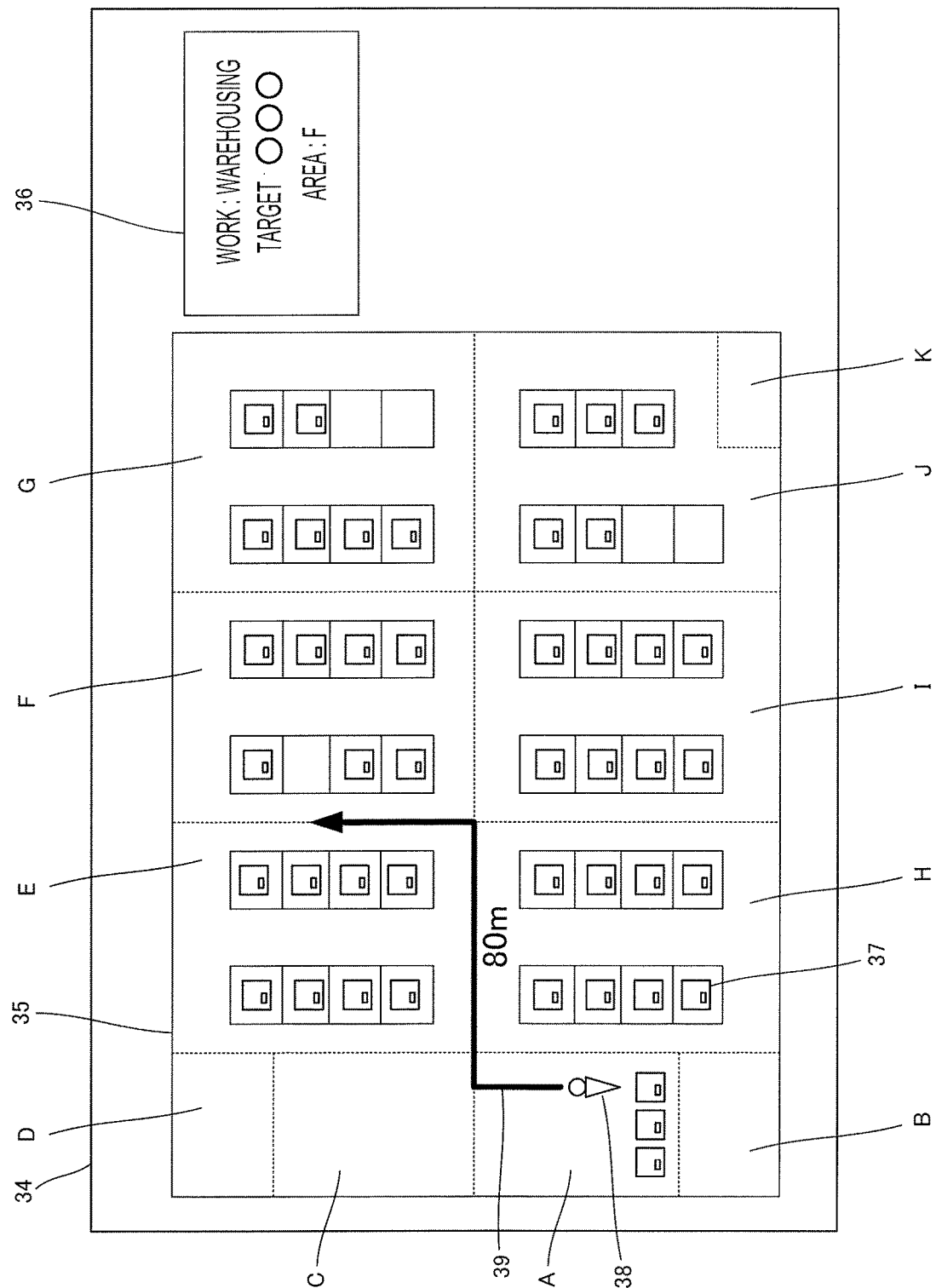
FIG. 5 is a diagram illustrating a displayed content of a display unit.

As illustrated in FIG. 5, a warehouse map 35, work information 36, or the like are displayed on the display unit 34 of the portable terminal 30. In addition, an object mark 37 may be displayed on the warehouse map 35 in a place where the object 1 is stored on the basis of the information stored in the database 63*c* and the location information of the object-attached tag 20, or an operator mark 38 may be displayed on the warehouse map 35 in a location of the operator on the basis of the location information of the operator's tag 10. In addition, path information 39 and distance information for efficient movement of the operator in the warehouse may also be displayed. Alternatively, the same content as that displayed in the display unit 34 may also be displayed in a monitor (not shown) of the computer 60.

As illustrated in the warehouse map 35 of FIG. 5, the warehouse is sectioned into a plurality of areas. According to this embodiment, the warehouse is sectioned into an import area A where the object 1 unloaded from the import truck 200 is placed, an unloading dock B where the import truck 200 used to import the object 1 into the warehouse is parked, an dispatching area C where an object to be shipped is placed, a loading dock D where an export truck used to export the object 1 from the warehouse is parked, storage areas E to J where the objects 1 are stored, and a treatment area K where treatment for reusing the object-attached tag 20 detached from the object 1 is performed.

The work information 36 displayed on the display unit 34 includes a work content, a work target, and an area where the operator performs the operation. In FIG. 5, the storage area F is displayed as a work area. In addition, path information 39 and distance information to an empty storage space in the storage area F are displayed on the warehouse map 35.

As the aforementioned inspection operation is terminated, the computer 60 specifies an object 1 as a warehousing target on the basis of the warehousing instruction data stored in the database 63c and transmits a warehousing operation instruction to the portable terminal 30 to start a warehousing process. In the warehousing operation, the operator carries the object 1 specified as a warehousing target from the import area A to an empty storage space of the storage areas E to J.

In step S201, the computer 60 determines whether or not the operator and the object 1 are placed within a predetermined first distance, and they are moving.

Specifically, the computer 60 determines whether or not the location of the operator's tag 10 and the location of the object-attached tag 20 are within the first distance, and they are moving. The predetermined first distance is set to, for example, "1 m".

If the location of the operator and the location of the object 1 are placed near each other, and they are moving, it is considered that the operator is carrying the object 1. Therefore, in this determination, it can be determined whether or not the operator is carrying the object 1.

If the determination of step S201 is affirmative, the computer 60 advances the process to step S202. Otherwise, if the determination of step S201 is negative, the computer 60 advances the process to step S207. Steps S207 to S209 will be described below.

In step S202, the computer 60 determines whether or not the object 1 that is being carried by the operator corresponds to any one of the warehousing target objects 1.

Specifically, the computer 60 determines whether or not the second information of the object-attached tag 20 attached to the object 1 that is being carried by the operator matches second information corresponding to any one of the objects 1 specified as the warehousing target.

If the determination of step S202 is affirmative, the computer 60 advances the process to step S203. Otherwise, if the determination of step S202 is negative, the computer 60 advances the process to step S210.

If the determination of step S202 is negative, it is considered that the object 1 that is being carried by the operator is not the object 1 specified as the warehousing target. Therefore, in this case, the computer 60 determines that an abnormal operation is performed and transmits an error signal to the portable terminal 30 (step S210).

In step S203, the computer 60 starts to store the movement path of the operator as a conveyance path for a warehousing operation.

Specifically, the computer 60 stores the location information of the operator's tag 10 in the database as time-series data. As a result, it is possible to acquire movement path information of the operator when the operator carries the object 1.

In step S204, the computer 60 determines whether or not the object 1 that is being carried is placed in an empty storage space, and a distance from the operator is equal to or greater than the first distance.

Specifically, the computer 60 determines whether or not the location of the object-attached tag 20 attached to the object 1 that is being carried is placed in an empty storage space, and a distance between the location of the operator's tag 10 and the location of the object-attached tag 20 attached to the object 1 that is being carried is equal to or greater than the first distance.

If the location of the object-attached tag 20 is placed in the empty storage space, and the distance of the operator's tag 10 is equal to or greater than the first distance, it is considered that the operator places the object 1 in the empty storage space and recedes from the object 1, that is, the object 1 is warehoused. Therefore, in this determination, it is possible to determine whether or not the operator warehouses the object 1.

If the determination of step S204 is affirmative, the computer 60 advances the process to step S205. Otherwise, if the determination of step S204 is negative, the computer 60 repeatedly performs the process of step S204.

In step S205, the computer 60 stores warehousing completion information in the database 63c for the object 1 placed in the storage space.

In step S206, the computer 60 determines whether or not the warehousing is completed for all objects 1 specified as the warehousing target by referencing the database 63c.

If the determination of step S206 is affirmative, the computer 60 terminates the warehousing process. Otherwise, if the determination of step S206 is negative, the computer 60 repeatedly performs the process from step S201.

Subsequently, steps S207 to S209 will be described.

In step S207, the computer 60 starts to store the movement path of the operator as a non-conveyance path for a warehousing operation.

Specifically, the computer 60 stores the location information of the operator's tag 10 in a database as time-series data. As a result, it is possible to acquire movement path information of the operator who does not carry an object 1.

In step S208, the computer 60 determines whether or not the operator and any one of the objects 1 specified as the warehousing target are within a predetermined second distance.

Specifically, the computer 60 determines whether or not the location of the operator's tag 10 and the location of the object-attached tag 20 attached to any one of the objects 1 specified as the warehousing target are within the second distance. The predetermined second distance is set to, for example, "10 m".

If the determination of step S208 is affirmative, the computer 60 advances the process to step S209. In addition, if the determination of step S208 is negative, the computer 60 repeatedly performs the process from step S201.

In step S209, the computer 60 transmits an operation instruction signal for operating the LED 21 of the object-attached tag 20 of the object 1 specified as the warehousing target and placed within the second distance from the operator's tag 10 in a specific pattern indicating that the object 1 is the warehousing target.

As a result, as an operator approaches the object 1 of the warehousing target, the LED 21 of the object 1 is operated in a specific pattern indicating that the object 1 is the warehousing target. Therefore, it is possible to allow the operator to easily specify the warehousing target object 1.

As described above, the computer 60 stores, in the database, the movement path of the operator who carries the object 1 as the conveyance path for the warehousing operation and stores the movement path of the operator who does not carry the object 1 as the non-conveyance path for the warehousing operation.

Such information is accumulated during the warehousing operation, and is used to determine path information 39 for allowing an operator to efficiently move in the warehousing operation. For example, when an operator carries an object 1, the conveyance path for the warehousing operation is analyzed, and the path information 39 is then determined. When the operator does not carry an object 1, the non-conveyance path for the warehousing operation is analyzed, and the path information 39 is then determined. As a result, it is possible to determine the path information 39 efficiently depending on a work status.

Note that the aforementioned warehousing process can also be applied to a case where an operator carries a plurality of objects 1 at once.

Subsequently, a shipping operation using the management system 100 will be described with reference to FIG. 6.

Figure 6:
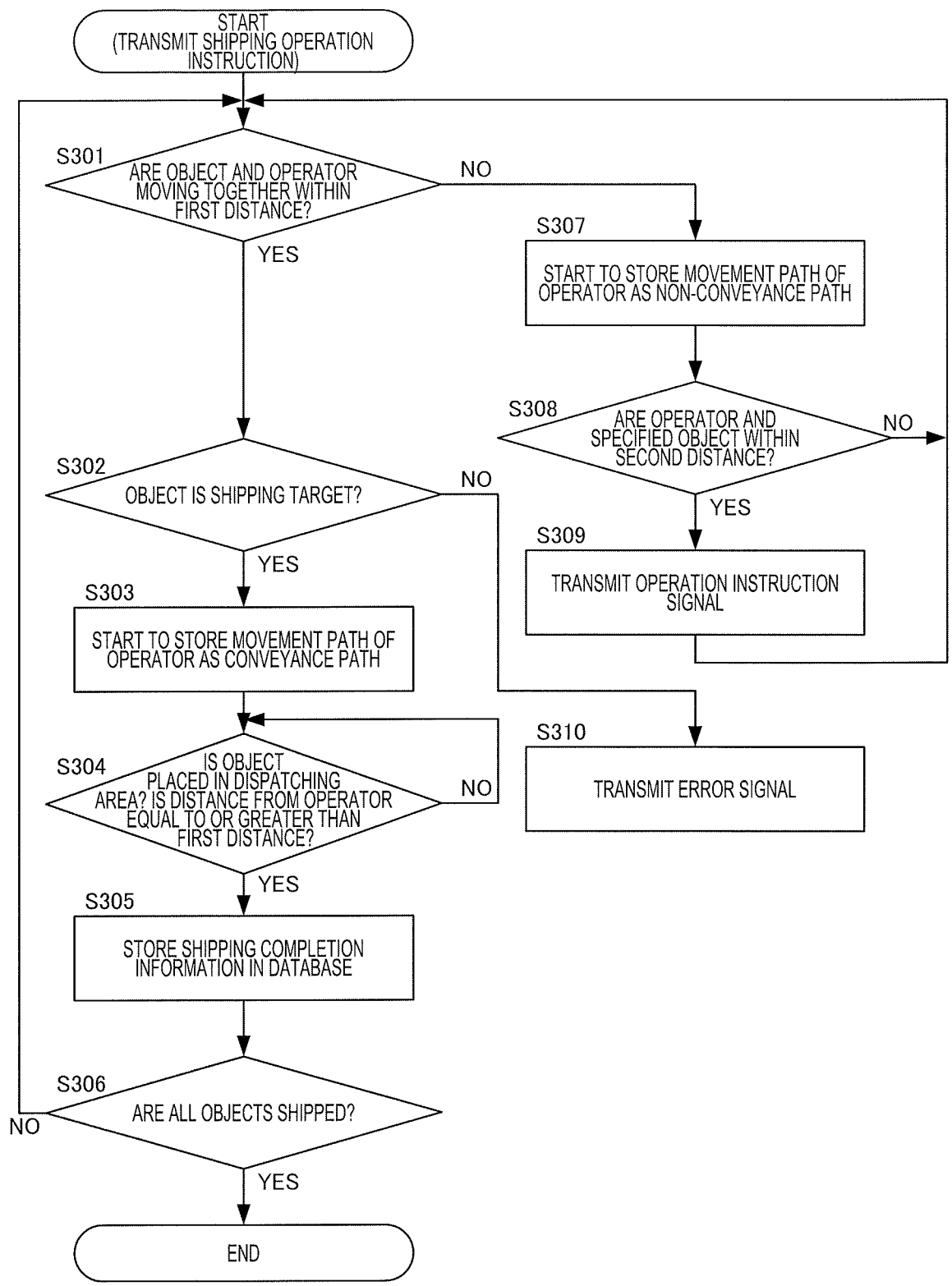
FIG. 6 is a flowchart illustrating a sequence of a shipping process performed by a computer.

FIG. 6 is a flowchart illustrating a sequence of the shipping process performed by the computer 60.

The computer 60 starts a shipping process by specifying a shipping target object 1 on the basis of the shipping operation instruction data stored in the database 63c and transmitting a shipping operation instruction to the portable terminal 30. In the shipping operation, the operator carries the object 1 specified as the shipping target from a storage space of the storage areas E to J to the dispatching area C.

Similar to the warehousing operation, in the shipping operation, the warehouse map 35, the work information 36, the object mark 37, the operator mark 38, the path information 39, and the like are displayed on the display unit 34 of the portable terminal 30.

In step S301, the computer 60 determines whether or not the operator and the object 1 are placed within a predetermined first distance, and they are moving. A specific process is similar to that of step S201 of the warehousing process. Alternatively, instead of the predetermined first distance of the warehousing process, a distance different from the first distance may also be employed as the predetermined distance.

If the location of the operator and the location of the object 1 are near, and they are moving, it is considered that the operator is carrying the object 1. Therefore, through the aforementioned process, it is possible to determine whether or not the operator is carrying the object 1.

If the determination of step S301 is affirmative, the computer 60 advances the process to step S302. Otherwise, if the determination of step S301 is negative, the computer 60 advances the process to step S307. Steps S307 to S309 will be described below.

In step S302, the computer 60 determines whether or not the object 1 that is being carried by the operator corresponds to any one of the shipping target objects 1.

Specifically, the computer 60 determines whether or not the second information of the object-attached tag 20 attached to the object 1 that is being carried by the operator matches second information corresponding to any one of the objects 1 specified as the shipping target.

If the determination of step S302 is affirmative, the computer 60 advances the process to step S303. Otherwise, if the determination of step S302 is negative, the computer 60 advances the process to step S310.

If the determination of step S302 is negative, it is considered that the object 1 that is being carried by the operator is not the object 1 specified as the shipping target. Therefore, in this case, the computer 60 determines that an abnormal operation is performed and transmits an error signal to the portable terminal 30 (step S310).

In step S303, the computer 60 starts to store the movement path of the operator as a conveyance path for the shipping operation. A Specific process is similar to that of step S203 of the warehousing process.

In step S304, the computer 60 determines whether or not the object 1 that is being carried is placed in the dispatching area C, and the distance from the operator is equal to or greater than the first distance.

Specifically, the computer 60 determines whether or not the location of the object-attached tag 20 attached to the object 1 that is being carried is placed in the dispatching area C, and a distance between the location of the operator's tag 10 and the location of the object-attached tag 20 attached to the object 1 that is being carried is equal to or greater than the first distance.

If the location of the object-attached tag 20 is placed in the dispatching area C, and the distance from the operator's tag 10 is equal to or greater than the first distance, it is considered that the operator places the object 1 in the dispatching area C and recedes from the object 1, that is, the object 1 is shipped. Therefore, through the aforementioned process, it is possible to determine whether or not the operator performs shipping of the object 1.

If the determination of step S304 is affirmative, the computer 60 advances the process to step S305. Otherwise, if the determination of step S304 is negative, the computer 60 repeatedly performs the process of step S304.

In step S305, the computer 60 stores shipping completion information in the database 63c for the object 1 placed in the dispatching area C.

In step S306, the computer 60 determines whether or not the shipping is completed for all objects 1 specified as the shipping target by referencing the database 63c.

If the determination of step S306 is affirmative, the computer 60 terminates the shipping process. Otherwise, if the determination of step S306 is negative, the computer 60 repeatedly performs the process from step S301.

Subsequently, steps S307 to S309 will be described.

In step S307, the computer 60 starts to store the movement path of the operator as a non-conveyance path for a dispatching operation. A specific process is similar to that of step S207 of the warehousing process.

In step S308, the computer 60 determines whether or not a distance between the operator and any one of the objects 1 specified as a shipping target is within a predetermined second distance.

Specifically, the computer 60 determines whether or not the location of the operator's tag 10 and the location of the object-attached tag 20 attached to any one of the objects 1 specified as the shipping target are placed within the second distance. Alternatively, instead of the predetermined second distance of the warehousing process, a distance different from the second distance may also be employed as the predetermined distance.

If the determination of step S308 is affirmative, the computer 60 advances the process to step S309. In addition, if the determination of step S308 is negative, the computer 60 repeatedly performs the process from step S301.

In step S309, the computer 60 transmits an operation instruction signal for operating the LED 21 of the object-attached tag 20 of the object 1 specified as the shipping target and placed within the second distance from the operator's tag 10 in a specific pattern indicating that the object 1 is the shipping target.

As a result, as the operator approaches the shipping target object 1, the LED 21 of this object 1 is operated in the specific pattern indicating that the object 1 is the shipping target. Therefore, it is possible to allow the operator to easily specify the shipping target object 1.

As described above, the computer 60 stores, in the database, the movement path of the operator who carries an object 1 as a conveyance path for a shipping operation and stores the movement path of the operator who does not carry an object 1 as a non-conveyance path for a shipping operation.

Such information is accumulated during the shipping operation and is used to determine the path information 39 for allowing an operator to efficiently move during the shipping operation. For example, when the operator carries an object 1, the conveyance path for the shipping operation is analyzed, and the path information 39 is then determined. When the operator does not carry an object 1, the non-conveyance path for the shipping operation is analyzed, and the path information 39 is then determined. As a result, it is possible to determine the path information 39 efficiently depending on a work status.

Note that the aforementioned shipping process can also be applied to a case where the operator carries a plurality of objects 1 at once.

Subsequently, a dispatching operation using the management system 100 will be described with reference to FIG. 7.

Figure 7:
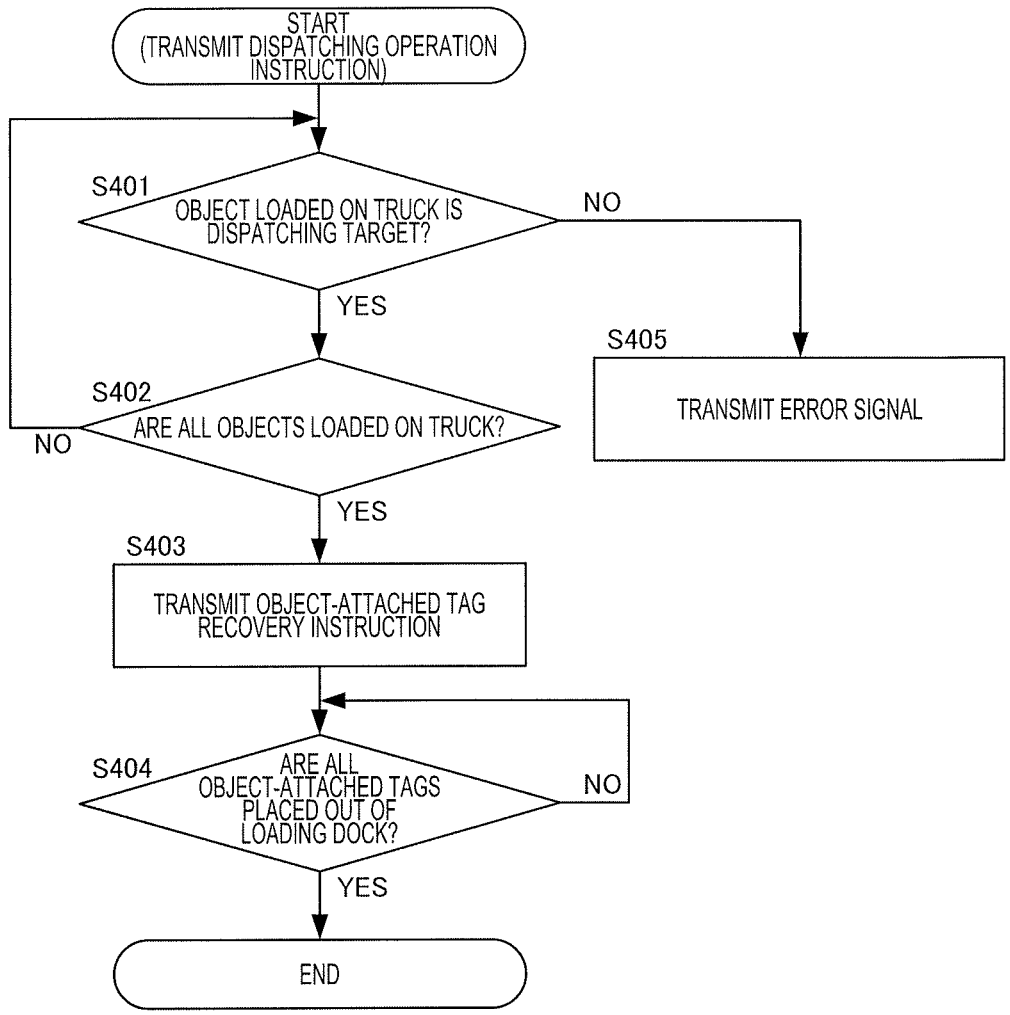
FIG. 7 is a flowchart illustrating a sequence of a dispatching process performed by a computer.

FIG. 7 is a flowchart illustrating a sequence of the dispatching process performed by the computer 60.

As the aforementioned shipping operation is terminated, the computer 60 starts a dispatching process by specifying a dispatching target object 1 on the basis of the dispatching instruction data stored in the database 63c and transmitting a dispatching operation instruction to the portable terminal 30. In the dispatching operation, the operator loads the object 1 specified as the dispatching target from the dispatching area C to the export truck parked at the loading dock D.

Similarly, in the dispatching operation, the warehouse map 35, the work information 36, the object mark 37, the operator mark 38, and the like are displayed on the display unit 34 of the portable terminal 30. Since the dispatching area C and the loading dock D are neighbored to each other, the path information 39 is not displayed. Alternatively, the path information 39 may also be displayed.

In step S401, the computer 60 determines whether or not the object 1 loaded on the export truck is the dispatching target object 1.

Specifically, the computer 60 determines whether or not the second information of the object-attached tag 20 of the object 1 placed in the loading dock D matches second information corresponding to any one of the objects 1 specified as a dispatching target.

If the object-attached tag 20 is placed in the loading dock D where the export truck is parked, it is considered that the object 1 of the object-attached tag 20 is being loaded on the export truck. Therefore, through the aforementioned process, it is possible to determine whether or not the dispatching target object 1 is loaded on the export truck.

If the determination of step S401 is affirmative, the computer 60 advances the process to step S402. Otherwise, if the determination of step S401 is negative, the computer 60 advances the process to step S405.

If the determination of step S401 is negative, it is considered that the object 1 loaded on the export truck is not the object 1 specified as a dispatching target. Therefore, in this case, the computer 60 determines that an abnormal work is performed, and transmits an error signal to the portable terminal 30 (step S405).

In step S402, the computer 60 determines whether or not the loading on the export truck is completed for all the objects 1 specified as the dispatching target.

Specifically, the computer 60 determines whether or not the second information of each of all the object-attached tags 20 placed in the loading dock D matches second information corresponding to any one of the objects 1 specified as the dispatching target.

If the determination of step S402 is affirmative, the computer 60 advances the process to step S403. Otherwise, if the determination of step S402 is negative, the computer 60 repeatedly performs the process from step S401.

In step S403, the computer 60 transmits, to the portable terminal 30, an instruction for recovering the object-attached tag 20.

In step S403, the computer 60 determines whether or not all of the object-attached tags 20 are placed out of the loading dock D.

If the determination of step S404 is affirmative, the computer 60 determines that the operator detaches and recovers all the object-attached tags 20 from the objects 1 loaded on the export truck and terminates the dispatching process. Otherwise, if the determination of step S402 is negative, the computer 60 repeatedly performs the process of step S404.

Meanwhile, the warehouse is sectioned into a plurality of areas as described above. In the treatment area K, a process of reusing the object-attached tags 20 detached from the objects 1 is performed.

Specifically, the computer 60 automatically deletes, from the database, information for associating the second information corresponding to the object-attached tag 20 placed in the treatment area K with the first information.

As a result, the object-attached tag 20 is automatically returned to a reusable state just when the operator brings the object-attached tag 20 detached from the object 1 during the dispatching operation into the treatment area K.

As described above, using the management system 100 according to this embodiment, it is possible to associate the first information and the second information stored in the memory medium 63 on the basis of the location information of each object-attached tag 20 and the location information of the operator's tag 10 just by scanning the bar code 2 attached to the target object 1 with the scanner 40.

Specifically, when the first information is acquired, the computer 60 associates the second information corresponding to the object-attached tag 20 placed nearest to the operator's tag 10 with the first information corresponding to the bar code 2 attached to the target object 1.

As a result, it is possible to associate the first information with the second information without a cumbersome work. Therefore, it is possible to reduce an operator's work burden.

The object-attached tag 20 has the LED 21, and the computer 60 transmits the operation instruction signal for operating the LED 21 of the object-attached tag 20 corresponding to the second information associated with the first information.

As a result, it is possible to allow the operator to visually recognize which object-attached tag 20 is associated with the target object 1 in practice.

When the operator's tag 10 approaches the object-attached tag 20 attached to any one of the objects 1 specified as a warehousing and shipping target within a predetermined first distance during the warehousing and shipping operation, the computer 60 transmits the operation instruction signal for operating the LED 21 of the object-attached tag 20.

As a result, it is possible to allow the operator to easily specify the warehousing and shipping target object 1.

The computer 60 determines the warehousing and shipping work status using the location information of each object-attached tag 20 and the location information of the operator's tag 10.

As a result, it is possible to determine and manage the work status such as warehousing and shipping even when the operator does not perform a cumbersome work such as scanning the bar code 2 with the scanner 40 during the operation. Therefore, it is possible to reduce an operator's work burden.

While the embodiment of the present invention has been described hereinbefore, the aforementioned embodiment is just for illustrative purposes to show any one of the applications of the invention, and is not intended to limit the scope of the invention to those described in the embodiment.

For example, although the management system 100 is used in a logistic warehouse by way of example in the aforementioned embodiment, the management system 100 may also be employed, for example, in a market depot, or a hospital warehouse, and the like.

Although the computer 60 executes steps S101, S102, and S104, steps subsequent to step S109, the warehousing process of FIG. 4, the shipping process of FIG. 5, and the dispatching process of FIG. 6 in the aforementioned embodiment, some of the processes or steps may be executed by the portable terminal 30 in a distributed manner.

Although the portable terminal 30 and the computer 60 are connected via the network 300 in the aforementioned embodiment, the portable terminal 30 and the computer 60 may also be connected via a wireless router.

The computer 60 may be connected to a cloud server on the Internet, and the processes or steps executed by the computer 60 may also be executed by the cloud server. When the cloud server executes the aforementioned processes or steps, the management system 100 may not have the computer 60. Instead, each device such as the portable terminal 30 may be directly connected to the cloud server via the Internet.

Although the operator's tag 10 and the portable terminal 30 are separately provided in the aforementioned embodiment, they may be provided in an integrated manner.

Although the bar code 2 is used as the optical recognition code in the aforementioned embodiment, other optical recognition means such as a two-dimensional code or a marker indicating information through color transition may also be employed.

Although the object-attached tag 20 has a single LED 21 in the aforementioned embodiment, the number of LEDs may change arbitrarily. In addition, any type of lamps other than the LED may also be employed. A display unit or the like may be used instead of the LED.

Although the object-attached tag 20 is attached to the object 1 in the aforementioned embodiment, the object-attached tag 20 may be attached to a pallet where the object 1 is placed or a container or the like where the object 1 is housed. Even in this case, it is assumed that the object-attached tag 20 is attached to the object 1.

This application claims priority based on Japanese Patent Application No. 2015-208601, filed in the Japan Patent Office on Oct. 23, 2015, the entire contents of which are incorporated herein by reference.

The invention claimed is:

1. A warehousing and shipping management system comprising:
   a scanner configured to acquire first coded information contained in a recognition code attached to a target object out of a plurality of objects, a recognition code being attached to each of the plurality of objects;
   a plurality of fixed radio communication units configured to:
   communicate with object-attached radio communication tags respectively attached to each of the plurality of objects and automatically acquire object location information of each of object-attached radio communication tags, and
   communicate with an operator's radio communication tag attached to an operator and automatically acquire operator location information of the operator's radio communication tag; and
   at least one processor configured to:
   specify second coded information corresponding to an object-attached radio communication tag attached to the target object, on the basis of the object location information of the object-attached radio communication tags and the operator location information of the operator's radio communication tag when the first coded information for the target object is acquired by the scanner,
   when the first coded information for the target object is acquired by the scanner, associate the first coded information for the target object with the second coded information as association information by performing steps comprising:
      (1) comparing the object location information of each of the object-attached radio communication tags acquired by the plurality of fixed radio communication units and the operator location information of the operator's radio communication tag acquired by the plurality of fixed radio communication units,
      (2) determining, based on a result of the comparison, an object-attached radio communication tag located nearest to a location of the operator's radio communication tag, and
      (3) associating, based on a result of the determination, the second coded information corresponding to the object-attached radio communication tag located nearest to the location of the operator's radio communication tag with the first coded information acquired by the scanner, and
   store the association information in a memory.

2. The warehousing and shipping management system according to claim 1, wherein the object-attached radio communication tag comprises a light, and the warehousing and shipping management system further comprises a transmitter configured to transmit an operation instruction signal for operating the light of the object-attached radio communication tag corresponding to the second coded information associated with the first coded information by the processor.

3. The warehousing and shipping management system according to claim 2, wherein, when the operator's radio communication tag comes within a predetermined distance of a specific object-attached radio communication tag in at least one of a warehousing operation or a shipping operation, the transmitter transmits the operation instruction signal for operating the light of the specific object-attached radio communication tag.

4. The warehousing and shipping management system according to claim 1, wherein
the at least one processor is configured to determine a work status using the object location information of object-attached radio communication tags and the operator location information of the operator's radio communication tag.

5. The warehousing and shipping management system according to claim 2, wherein
the at least one processor is configured to determine a work status using the object location information of object-attached radio communication tags and the operator location information of the operator's radio communication tag.

6. The warehousing and shipping management system according to claim 3, wherein
the at least one processor is configured to determine a work status using the object location information of object-attached radio communication tags and the operator location information of the operator's radio communication tag.

7. The warehousing and shipping management system according to claim 1, wherein
the plurality of fixed radio communication units acquire the object location information of object-attached radio communication tags on the basis of communication with the object-attached radio communication tags and the operator location information of the operator's radio communication tag on the basis of communication with the operator's radio communication tag.

8. The warehousing and shipping management system according to claim 1, wherein the at least one processor is configured to, when the memory does not include first coded information matching with the first coded information acquired by the scanner, determine that an abnormality in inspection has occurred and transmit an error signal.

9. The warehousing and shipping management system according to claim 1, wherein the object-attached radio communication tag comprises a light,
the at least one processor is configured to cause transmission of an operation instruction signal for operating the light of the object-attached radio communication tag, corresponding to the second coded information associated with the first coded information, in a specific pattern indicating that the first coded information is associated with the second coded information, and
the light is configured to, when the operation instruction signal is received, flicker in the specific pattern.

10. The warehousing and shipping management system according to claim 1, wherein the plurality of fixed radio communication units is configured to communicate with the operator's radio communication tag and the object-attached radio communication tags based on an ultra wide band (UWB) scheme.

11. The warehousing and shipping management system according to claim 1, wherein the at least one processor is configured to automatically delete, from the memory, the association information corresponding to the object-attached tag, when the tag is detached from the object and placed in a predetermined area.

12. A warehousing and shipping management method comprising:
acquiring first coded information contained in a recognition code attached to a target object out of a plurality of objects, a recognition code being attached to each of the plurality of objects;
communicating, by a plurality of fixed radio communication units, with object-attached radio communication tags respectively attached to each of the plurality of objects and automatically acquiring object location information of each of object-attached radio communication tags;
communicating, by the plurality of fixed radio communication units, with an operator's radio communication tag attached to an operator and automatically acquiring operator location information of the operator's radio communication tag;
specifying second coded information corresponding to an object-attached radio communication tag attached to the target object, on the basis of the object location information of the object-attached radio communication tags and the operator location information of the operator's radio communication tag when the first coded information for the target object is acquired;
when the first coded information for the target object is acquired by a scanner, associating the first coded information for the target object with the second coded information as association information; and
storing the association information in a memory,
wherein the step of associating the first coded information comprises:
(1) comparing the acquired object location information of each of the object-attached radio communication tags acquired by the plurality of fixed radio communication units and the operator location information of the operator's radio communication tag acquired by the plurality of fixed radio communication units, respectively,
(2) determining, based on a result of the comparison, an object-attached radio communication tag located nearest to a location of the operator's radio communication tag, and
(3) associating the second coded information corresponding to the nearest object-attached radio communication tag with the first coded information acquired by the scanner.

13. A non-transitory computer-readable medium storing a program executable by a computer of a warehousing and shipping management system, the program causing the computer to execute:
acquiring first coded information contained in a recognition code attached to a target object out of a plurality of objects, a recognition code being attached to each of the plurality of objects;
causing a plurality of fixed radio communication units to communicate with object-attached radio communication tags respectively attached to each of the plurality of objects and automatically acquire object location information of each of object-attached radio communication tags;

causing the plurality of fixed radio communication units to communicate with an operator's radio communication tag attached to an operator and automatically acquire operator location information of the operator's radio communication tag;

specifying second coded information corresponding to an object-attached radio communication tag attached to the target object, on the basis of the object location information of the object-attached radio communication tags and the operator location information of the operator's radio communication tag when the first coded information for the target object is acquired;

when the first coded information for the target object is acquired by a scanner, associating the first coded information for the target object with the second coded information as association information; and storing the association information in a memory, wherein the step of associating the first coded information comprises:
(1) comparing the object location information of each of the object-attached radio communication tags acquired by the plurality of fixed radio communication units and the operator location information of the operator's radio communication tag acquired by the plurality of fixed radio communication units,
(2) determining, based on a result of the comparison, an object-attached radio communication tag located nearest to a location of the operator's radio communication tag, and
(1) associating the second coded information corresponding to the nearest object-attached radio communication tag with the first coded information acquired by the scanner.

* * * * *